L. A. FERGUSON AND H. S. SINES.
GAS METERING APPARATUS.
APPLICATION FILED JAN. 24, 1917.
1,327,989.
Patented Jan. 13, 1920.
3 SHEETS—SHEET 1.
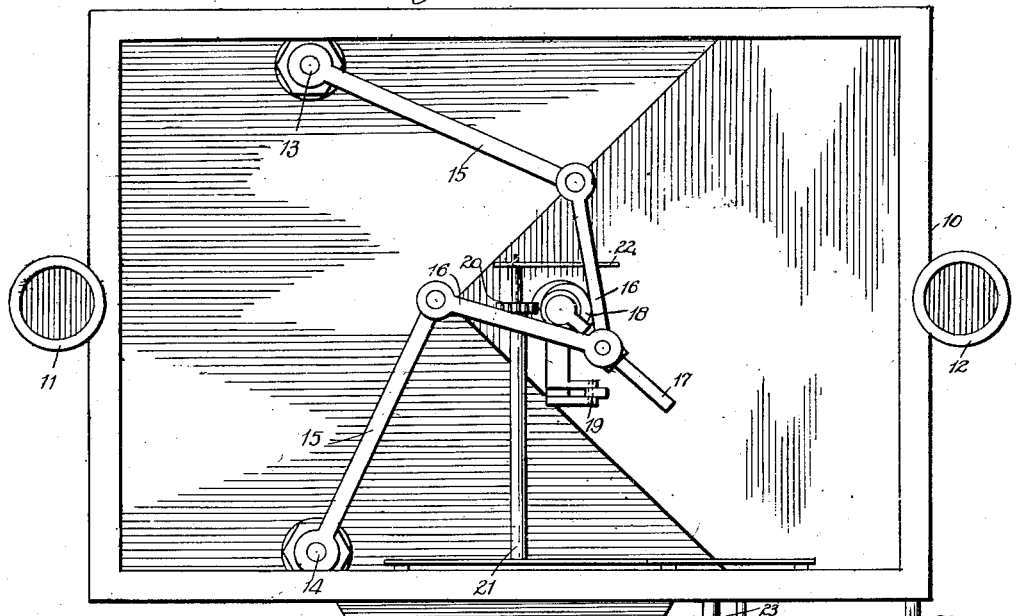
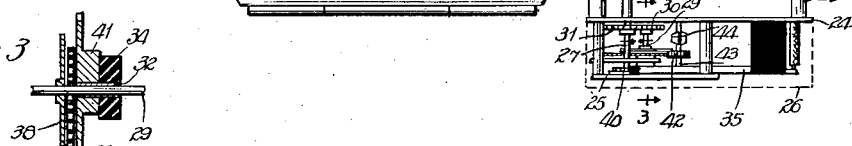
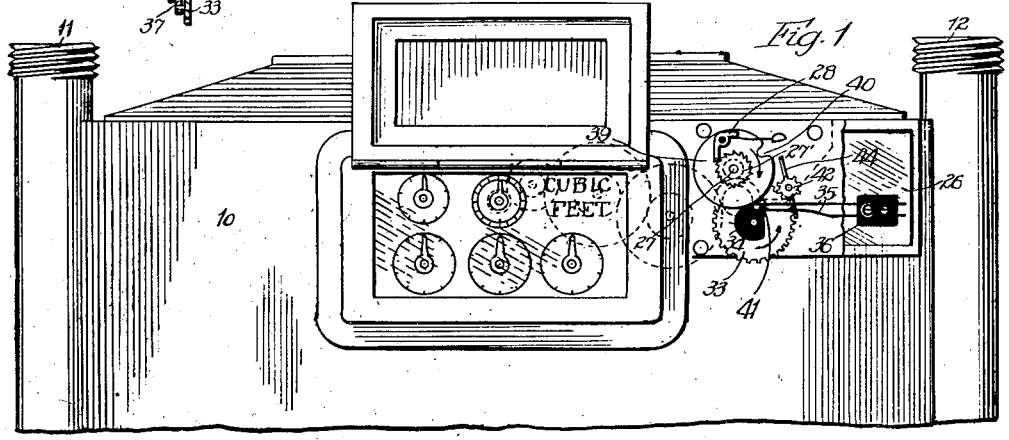
Witnesses:
Albin C. Ahlberg
Robert F. Bracke
Inventor
Louis A. Ferguson
Harold S. Sines.
By Williams, Bradbury & Lee
Attorneys

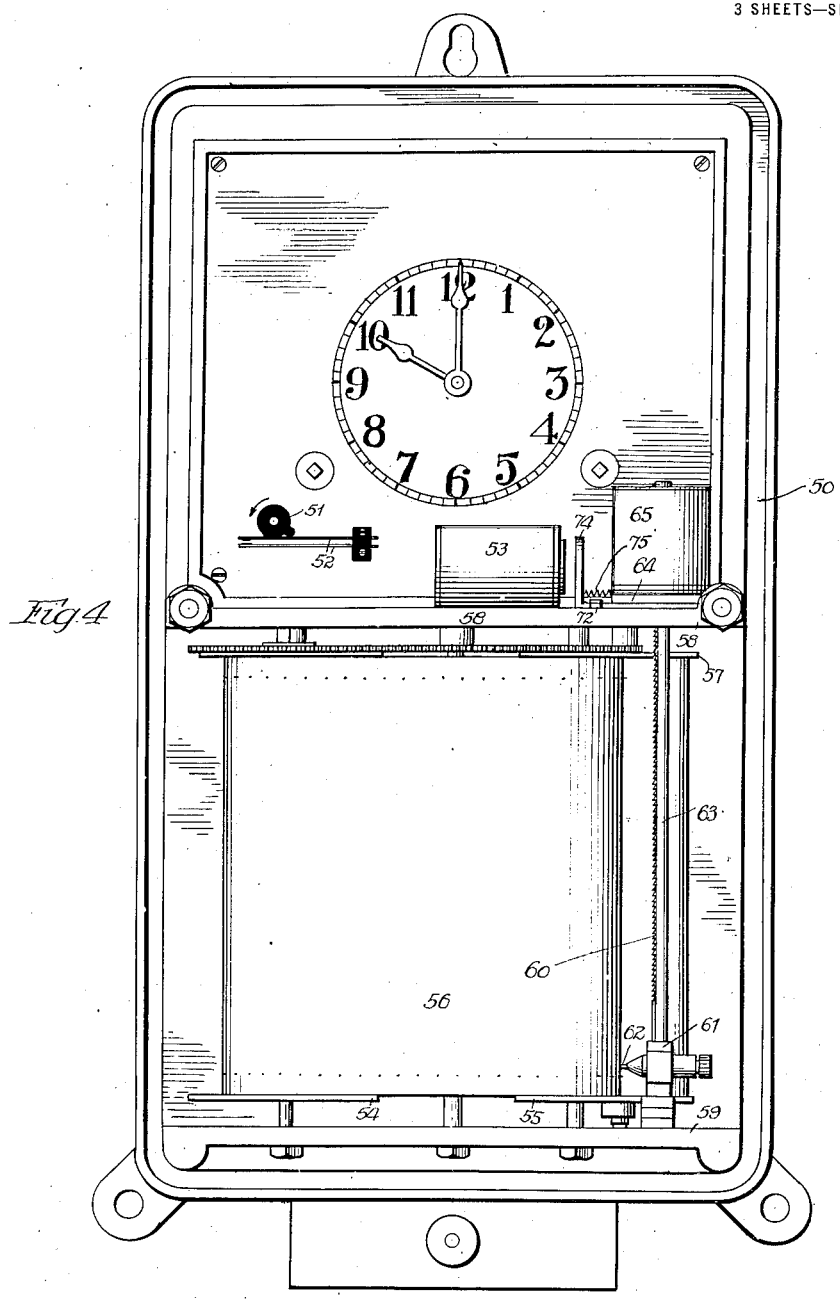

L. A. FERGUSON AND H. S. SINES.
GAS METERING APPARATUS.
APPLICATION FILED JAN. 24, 1917.
1,327,989.
Patented Jan. 13, 1920.
3 SHEETS—SHEET 3.
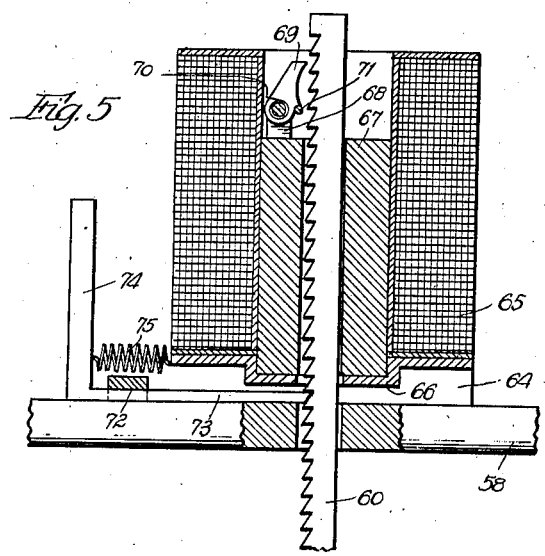
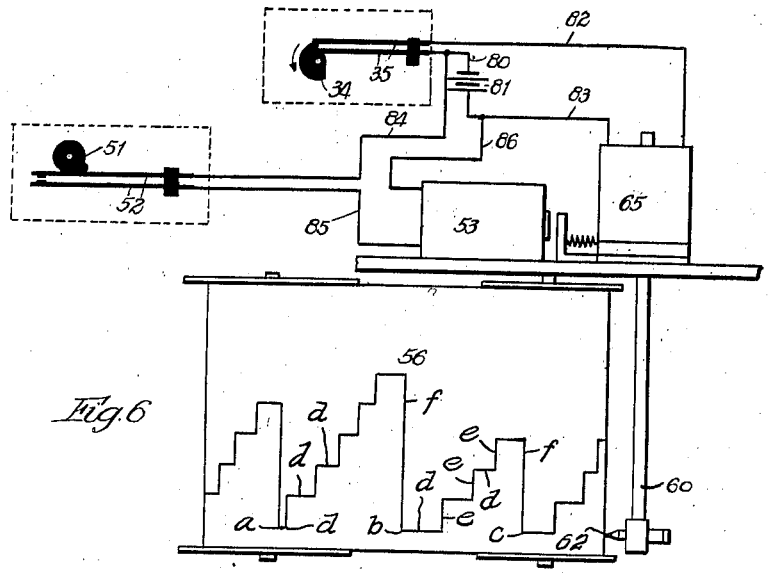

UNITED STATES PATENT OFFICE.

LOUIS A. FERGUSON, OF EVANSTON, AND HAROLD S. SINES, OF OAK PARK, ILLINOIS; SAID SINES ASSIGNOR TO SAID FERGUSON.

GAS-METERING APPARATUS.

1,327,989.   Specification of Letters Patent.   Patented Jan. 13, 1920.

Substitute for application Serial No. 872,713, filed November 18, 1914. This application filed January 24, 1917. Serial No. 144,123.

*To all whom it may concern:*

Be it known that we, LOUIS A. FERGUSON and HAROLD S. SINES, citizens of the United States, residing, respectively, at Evanston and Oak Park, in the county of Cook and State of Illinois, have invented certain new and useful Improvements in Gas-Metering Apparatus, of which the following is a full, clear, concise, and exact description, reference being had to the accompanying drawings, forming a part of this specification.

Our invention relates to gas metering apparatus and the object of our invention is to provide an apparatus of this class capable not only of recording the total amount of gas consumed during a long time period, say one month, but also capable of indicating the amount of gas consumed during each one of a plurality of short time periods into which the aforesaid long time period is divided. Our improved gas metering apparatus not only records the total gas consumption during the long time period but also records the gas consumption during each one of the several short time periods, which short time periods may be fifteen minutes, thirty minutes or one hour, et cetera, or any other suitable period, as desired.

The embodiment of our invention herein shown and described graphically records the consumption of gas during each one of the short time periods into which the long time period is divided whereby one reading the meter indications may not only know the total amount of gas consumed since the previous reading but knows also the maximum consumption during the several short time periods into which the long time period is divided. Thus a gas company utilizing the apparatus of my invention may charge its customers at rates dependent not only upon the total amount of gas consumed but also dependent upon the maximum consumption and the time at which said maximum consumption occurs if desired.

Our invention is fully set forth in the following description and is illustrated in the accompanying drawings, in which—

Figure 1 is a fragmentary elevational view of a gas meter provided with novel contact mechanism forming a part of the apparatus of our invention, certain parts being broken away to more clearly reveal the construction;

Fig. 2 is a plan view of the gas meter shown in Fig. 1, the cover for the meter casing being removed;

Fig. 3 is a fragmentary detail sectional view taken on the line 3—3 of Fig. 2 and looking in the direction indicated by the arrows;

Fig. 4 is an elevational view of the mechanism for graphically recording the gas consumption during the several short time periods heretofore mentioned, the recording apparatus shown in Fig. 4 being partially controlled by the contact making mechanism associated with the meter shown in Figs. 1 and 2;

Fig. 5 is a fragmentary sectional view of the electro-magnetic mechanism controlling the operation of the recording device; and Fig. 6 diagrammatically illustrates the circuit connections and electromagnetic devices whereby the recording device shown in Fig. 4 is controlled by the contact mechanism shown in Figs. 1 to 3 and clock controlled mechanism to be hereinafter referred to.

Similar reference numerals refer to similar parts throughout the several views.

Referring first to Figs. 1 and 2, I have illustrated a standard gas meter casing at 10, said casing being provided with a horizontal wall or walls by means of which the casing is divided into upper and lower compartments. At 11 and 12 are illustrated the inlet and outlet pipes for the gas meter, the pipes 11 and 12 being connected with suitable well known mechanism within the lower compartment of the casing 10, capable of oscillating shafts 13 and 14 as the gas flows through pipes 11 and 12. Fixed to each of the shafts 13 and 14 is a lever 15, each of the levers 15 being connected by means of a link 16 with a crank 17 fixed to a vertical shaft having rigidly mounted thereon a worm 18. As is well known to those skilled in the art, as shafts 13 and 14 are oscillated the worm 18 is driven at a rate proportional to the rate at which gas flows through the pipes 11 and 12. If desired, means illustrated at 19 may be provided to prevent the crank 17 being turned in reverse direction.

Coöperating with the worm 18 is a pinion 20 mounted upon a horizontal shaft 21 having the inner end thereof journaled in a bracket 22 and the other end thereof operatively connected with integrating mechanism capable of indicating the total amount of gas passed through the gas meter.

The mechanism just described does not differ materially from devices of the prior art but we have thought it best to briefly describe this mechanism in order that the operation of the improved mechanism which we provide for recording the quantities of gas metered during the several short time periods, may be readily understood. As will presently be pointed out in detail the devices for recording the quantities of gas consumed during the short time intervals are controlled in part by contact mechanism operated by the moving elements of the gas meter illustrated in Figs. 1 and 2. In practice the gas meter casing contains more or less gas and therefore in accomplishing the objects of our invention we find that it is impossible, with any degree of safety, to provide contact mechanism in proximity to the gas within the casing due to the sparking which inevitably occurs when the contacts are operated.

The contact mechanism referred to is located within a housing supported by the meter casing 10 but spaced therefrom by a plurality of posts 23. The housing preferably comprises spaced side plates 24 and 25 and a cover 26, which may have a glass pane if desired. Having its inner end connected by suitable gearing with the integrating mechanism supported by the casing 10 is a shaft 27 which passes freely through the plate 24 and has its outer end journaled in the plate 25. Fixed upon the outer end of the shaft 27 is a ratchet wheel 27' engaged by a spring pressed retaining pawl 28 carried by the plate 25. Mounted in the plates 24 and 25 and disposed parallel to the shaft 27 is a second shaft 29 having fixed thereon a spur gear 30 coöperating with a similar gear 31 fixed upon the shaft 27. Loosely disposed on the shaft 29 is a sleeve 32 having rigidly attached thereto a gear 33 and a contact operating cam 34 arranged when rotated to operate contact springs 35 mounted in a block of insulation 36 carried by the plate 24.

At 37 (Fig. 3) we have shown a coiled spring having its inner end fixed to the shaft 29 and its outer end fixed to the spur gear 33. The spring 37 is held in proper position by a disk 38 fixed to shaft 29. Fixed upon the shaft 27 is a disk 39 provided with a notch 40 cut in the periphery thereof. The notch 40 is arranged to coöperate with a cam 41 formed integral with the gear 33. The gear 33 is illustrated in Figs. 1 and 2 and coöperates with a pinion 42 mounted upon a shaft 43 provided with a fan 44. The operation of the contact mechanism just described is as follows:

Owing to the gear ratios each time that a predetermined amount of gas has been integrated by the integrating mechanism shown in Figs. 1 and 2, the disk 39 is brought into such position that the cam 41 which normally rides on the periphery of the disk 39 is permitted to slip into the notch 40 and make one revolution under the action of the coiled spring 37 in which power has previously been stored, due to the rotation of the shaft 29.

As the cam 41 rotates, the sleeve 32 and cam 34 of course rotate with it and the cam 34 closes the contact springs 35 and permits them to open again. The fan 44 steadies the operation of the parts and prevents the cam 34 from being turned too rapidly.

The mechanism illustrated in Figs. 4 and 5 comprises a base 50, supporting chronometer mechanism arranged to operate a cam 51 at predetermined intervals. The cam 51 may be arranged to be operated at intervals of fifteen minutes, thirty minutes or one hour, et cetera, as desired. The cam 51 operates a pair of contact springs 52 controlling the circuit for an electromagnet 53, the function of which will presently be made apparent.

Driven at a constant rate by the chronometer mechanism are rollers 54 and 55 which support a record sheet 56. The record sheet 56 is preferably so treated that when a pointed recording instrument to be hereinafter referred to is moved across the sheet a line will be made on the sheet. We have not thought it necessary to illustrate the mechanism interposed between the clock work and the rollers 54 and 55 inasmuch as any one skilled in the art to which our invention relates may supply operative mechanism for driving the rollers 54 and 55 at a constant rate. At 57 we have shown a supply roller that may be used to carry the supply of paper passed over the rollers 54 and 55.

As is clearly illustrated in Fig. 4 the base 50 is provided with two horizontal shelves 58 and 59 and it is in these shelves that the rollers 54 and 55 and 57 are mounted.

At 60 we have illustrated a rack provided at its lower end with a block 61 having adjustably mounted therein a stylus 62 arranged to engage the record sheet 56. In order to provide a guide for the stylus 62 we provide guide rods 63 located one on each side of the rack 60. The block 61 carrying the stylus 62 is provided with apertures through which the rods 63 extend. In the drawings we have illustrated but one of the rods 63, but in practice, as before stated, we find it desirable to employ two rods, one on each side of the rack 60. The guide rods 63 are supported by the shelves 58 and 59 as illustrated in Fig. 4.

The electromagnet 53 heretofore alluded to is mounted upon the shelf 58. Also mounted upon the shelf 58 is a solenoid base 64 carrying a solenoid 65 as is most clearly illustrated in Fig. 5. The solenoid base 64 is provided with a cup-like depression 66 in which normally rests the lower end of a solenoid core 67. The solenoid core 67, as illustrated in Fig. 5, is provided with a longitudinal opening through which extends the upper end of the stylus carrying rack 60, the said rack also extending through an opening in the shelf 58.

Supported by the solenoid core 67 is a bracket 68 upon which is pivotally mounted a pawl 69. A spring 70 normally tends to force the pawl into engagement with the teeth of the rack 60 but the pawl is provided with a shoulder, which when the solenoid is in normal position engages a pin 71, the pawl being thus normally held out of engagement with the rack 60.

Supported by the upper shelf 58 and guided by a bracket 72 is a detent rod 73 having a beveled end arranged to engage the stylus carrying rack 60. As is most clearly illustrated in Fig. 4 the rod 73 is formed integral with an armature 74 for the electromagnet 53. A spring 75 tends to draw the armature 74 to the right, thus holding the detent rod 73 in engagement with the rack 60.

By referring to Fig. 4 it will be apparent that for each energization of the solenoid 65 the core 67 will be moved upwardly until it abuts against the pin 71. When the solenoid core is actuated as set forth, the pawl 69 of course engages the rack and advances the same one step, the spring 75 associated with the armature 74 yielding to permit the detent rod 73 to move to the left as the rack 61 is raised.

The mechanism illustrated in Fig. 4 may be and preferably is provided with a glass cover but we have not thought it necessary to illustrate this cover in the drawing.

Referring to Fig. 6 it will be noted that in this figure, we have diagrammatically illustrated the circuit connections whereby the recording stylus 62 is controlled by the chronometer mechanism and the integrating train of the gas meter illustrated in detail in Figs. 1 and 2.

As has been hereinbefore pointed out the cam 34 associated with the contacts 35 is operated every time a predetermined amount of gas has passed through the gas meter, or in other words, the cam 34 is advanced by its associating driving mechanism every time the integrating mechanism of the gas meter has been advanced a predetermined amount. When the contacts 35 are closed by the cam 34 a circuit is closed through conductor 80 from the positive pole of battery 81, thence through contacts 35, conductor 82, solenoid 65 and conductor 83 to the negative pole of the battery 81. When this circuit is closed the solenoid 65 is of course energized and a one step advancement is imparted to the stylus carrying rack 60. The solenoid 65 is energized every time a predetermined amount of gas is passed through the meter and as the solenoid 65 continues to be operated the stylus 62 moves upwardly on the record sheet 56.

The chronometer mechanism is arranged to operate the cam 51 at the end of equal short periods of time, and when the cam is thus operated a circuit is closed through conductor 80 from the positive pole to the battery 81, conductor 84, contacts 52, conductor 85, electromagnet 53, conductor 86 and conductor 83 back to the negative pole of the battery. When this circuit is established the electromagnet 53 is of course energized and its armature 74 is drawn to the left, thus disengaging the detent 73 from the rack 60 and permitting the rack and stylus to drop to initial position by gravity.

Referring to Fig. 6 of the drawing wherein the curve traced by the stylus 62 upon the chart 56 is illustrated, the distances between the points $a$ and $b$, and $b$ and $c$ are the distances through which the chart travels during the predetermined short intervals of time, these distances being of equal length. The marks $d$ are made by the stylus during the interval of time required for the consumption of the first predetermined quantity of gas. When this quantity of gas has been consumed the solenoid 65 is energized by the closing of the contacts 35, causing the stylus 62 to rise and make the vertical line $e$ upon the chart. The lengths of the lines $d$ are, therefore, proportional to the interval of time during which the predetermined quantity of gas is consumed and the sum of the lengths of the lines $e$ is proportional to the quantity of gas consumed during the predetermined short time intervals. Since the line $f$ is equal to the sum of the lengths of the line $e$ this line is also proportional to the quantity of gas consumed during the predetermined short time interval and indicates the maximum amount of gas consumed during this short time interval.

While we have shown our invention in the particular embodiment herein shown and described, we do not limit ourselves to this arrangement, but desire to claim any equivalent constructions coming within the terms and spirit of the appended claims.

What we claim as new and desire to secure by Letters Patent of the United States is:

1. Mechanism for measuring and integrating the consumption of gas comprising a gas meter, a recording device adapted to indicate the greatest amount of gas integrated by the gas meter during any one of a number of intervals of time, electromagnetic mechanism for operating said recording device, a circuit for said electromagnetic mechanism, quickly acting contacts included in said circuit, a shaft driven from the integrating train of the gas meter, a cam for operating said contacts loosely mounted on said shaft, a spring interposed between the shaft and cam, means normally preventing said cam from moving under the action of said spring and means for permitting the spring to actuate the cam when a predetermined amount of gas has been measured and integrated by the gas meter.

2. Apparatus for measuring and recording the consumption of gas comprising a gas meter for measuring and recording the quantity of gas consumed during a long time period, means arranged to carry a record sheet, chronometer mechanism arranged to advance said record sheet at a uniform rate, a recording device arranged to indicate the greatest amount of gas integrated by the meter during any one of a number of intervals of time, said recording device comprising a stylus, a rack fixed to said stylus, a solenoid having a hollow core through which said rack extends, a pawl carried by the core arranged to engage said rack when the solenoid is energized, a detent for said rack, a circuit for said solenoid, contacts included in said circuit, means driven by the gas meter for operating said contacts, and chronometer controlled means for withdrawing said detent from engagement with the rack at regularly recurring intervals of time.

In witness whereof, we hereunto subscribe our names, in the presence of two witnesses, this 11th day of January, A. D. 1917.

LOUIS A. FERGUSON.
HAROLD S. SINES.

Witnesses to the signature of Louis A. Ferguson:
D. N. MILLER,
NORMAN KREPPEL.

Witnesses to the signature of Harold S. Sines:
R. L. BAYNE,
H. L. STROM.